May 2, 1933.  E. E. GREVE  1,906,790
REVERSING CLUTCH MECHANISM
Filed Aug. 16, 1928  2 Sheets-Sheet 2
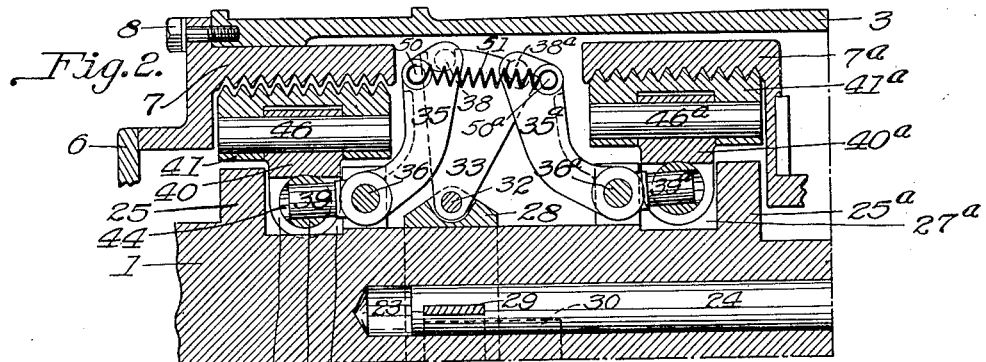
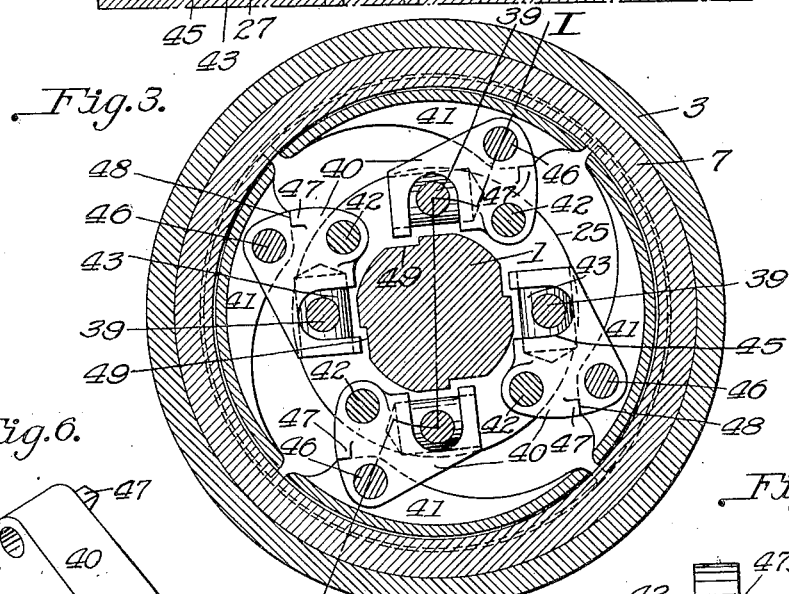
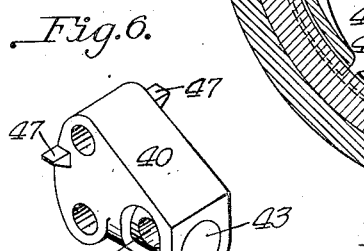
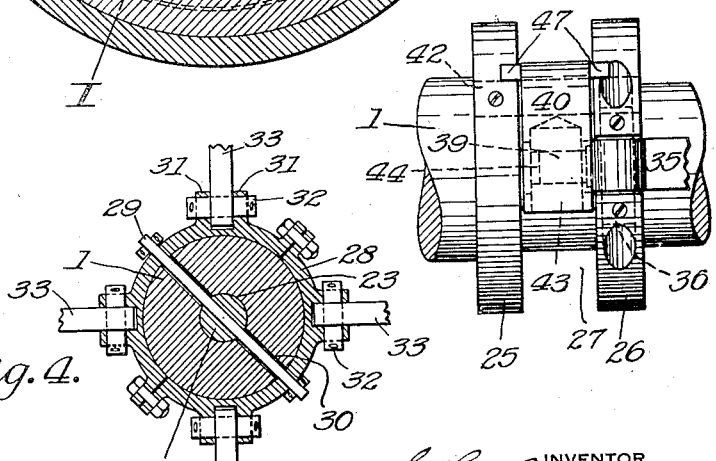
INVENTOR
E. E. Greve
by W. J. Doolittle
Attorney.

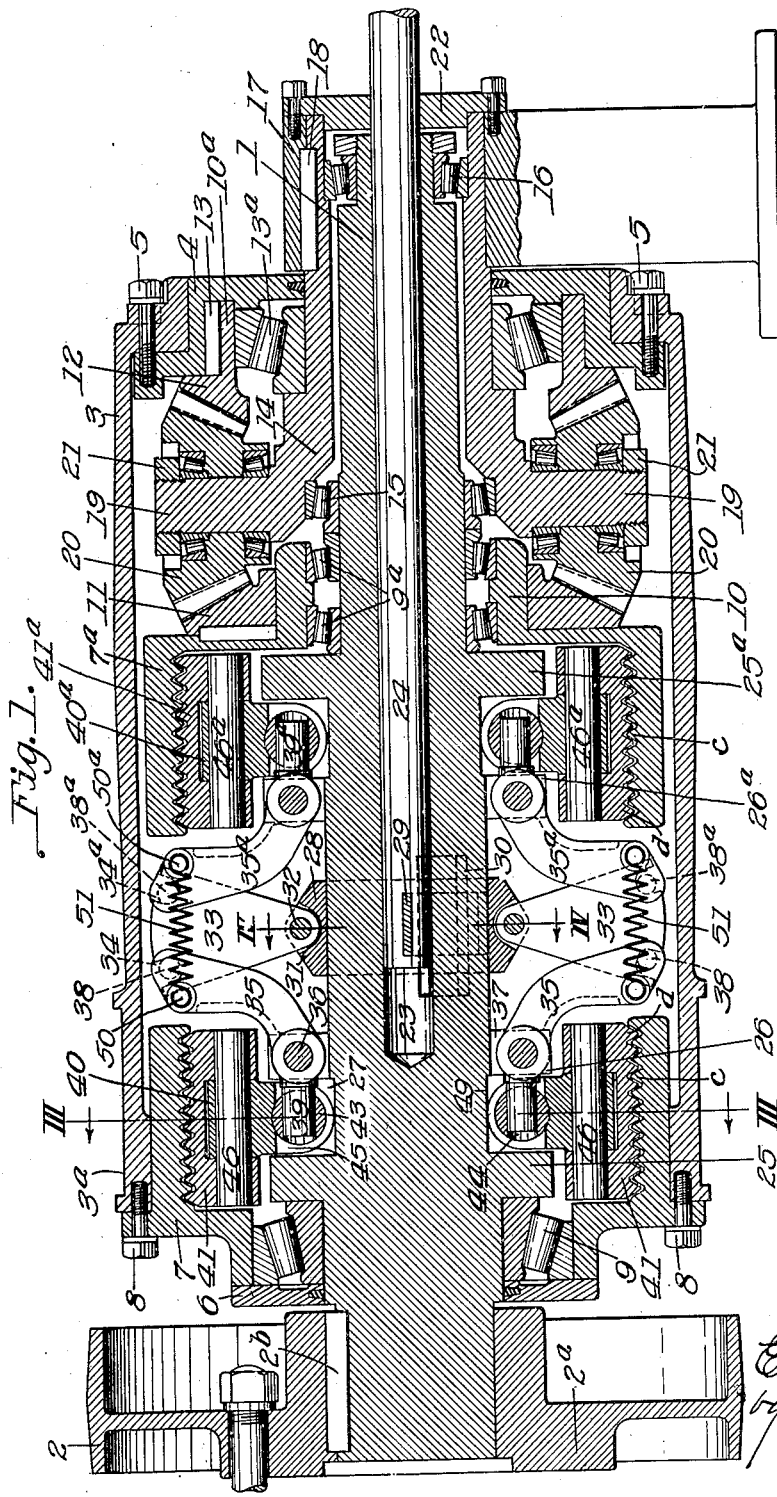

Patented May 2, 1933 1,906,790

UNITED STATES PATENT OFFICE

EDGAR E. GREVE, OF BELLEVUE, PENNSYLVANIA, ASSIGNOR, BY MESNE ASSIGNMENTS, TO OIL WELL SUPPLY COMPANY, OF PITTSBURGH, PENNSYLVANIA, A CORPORATION OF NEW JERSEY

REVERSING CLUTCH MECHANISM

Application filed August 16, 1928. Serial No. 299,914.

My invention relates to a reversing clutch mechanism, and particularly to a reverse clutch pulley mechanism designed for use in connection with engines employed in the oil and gas fields during the drilling of and the operation of wells. The present invention relates to the type shown in an application filed by me December 24, 1925, Serial No. 77,673, and in my Patent No. 1,835,153, issued December 8, 1931.

The prime object of the present invention is to provide new and improved clutch devices and actuating means therefor for use in connection with the reversing mechanism of the clutch pulley. An object of the invention is to provide a clutch and reversing mechanism of compact construction capable of being positioned inside a drum or pulley.

In the accompanying drawings, which illustrate an application of my invention:

Fig. 1 is a longitudinal sectional view, partly in elevation, of a clutch pulley embodying my invention, the section being taken on line I—I of Fig. 3;

Fig. 2, a detail view, particularly showing a portion of the linkage employed, showing the parts positioned to drive the pulley in reverse direction;

Fig. 3, a sectional view taken on line III—III of Fig. 1;

Fig. 4, a sectional view taken on line IV—IV of Fig. 1;

Fig. 5, a detail elevational view, showing a portion of the drive shaft, a shoe-link, and a link member cooperating with the shoe link; and Fig. 6, a perspective view of one of the shoe links.

In my invention, a driving shaft is connected alternatively to either one of a pair of clutch members through one of which a drum to be driven is rotated in one direction and through the opposite of which it is rotated by means of suitable clutch reversing mechanism in the opposite direction. The clutch members are urged to engaging positions by a resilient actuating mechanism such as a spring acting through appropriate lever or transmission mechanism. Normally the clutches are held in non-engaging position against the action of the spring or actuating mechanism by an operating mechanism which is slidable in one position to permit the spring actuating mechanism to move one clutch into engaging position and to move the opposite clutch further from the engaging position and when operated in the opposite direction permits the spring to move the opposite clutch in the engaging position and release the engaged clutch. This operating mechanism is axially mounted on the rotating shaft and is movable axially from one operating position to the other on the shaft.

Referring to the drawings, 1 designates the main or drive shaft of the reversing clutch mechanism, which is designed to be coupled with the drive shaft of an engine, not shown, by means of a coupling flange 2a of a pulley 2. Said pulley may be employed for driving a pump or other mechanism, not shown, and is secured to shaft 1 by a key 2b.

3 designates the main pulley and housing for the reversing clutch mechanism, and is provided with a brake band portion 3a. The bearing end of housing 3 is closed by means of a head 4 secured thereto by cap screws 5. The other end of said housing is closed by a cap 6 and a toothed clutch member or drum 7, the latter being secured to the housing by cap screws 8. The outer portion of the clutch drum is mounted on roller bearings 9 located between the main shaft and the drum.

Centrally disposed within the housing 3 is a second clutch drum 7a having a hub portion 10 mounted on roller bearings 9a disposed on shaft 1. Shrunk on hub 10 and keyed thereto, is a bevel gear 11, and a similar bevel gear 12 is secured to the head 4 by a press-fit hub 10a and a key 13, and is mounted on roller bearings 13a of a spider 14.

Spider 14 carries the bearings 15 and 16 for shaft 1, and is keyed to end post 17 by a key 18. Said spider is provided with four arms 19 disposed 90 degrees apart, and is located centrally of the bevel gears 11 and 12. Mounted on said arms, in suitable bearings, and adapted to engage the said bevel gears, I provide four bevel pinions 20. The bevel pinions and their bearings are secured on the arms by means of threaded nuts 21. It will be noted that the spider 14 is secured against rotation in the end post 17 and that a cap or plate 22 closes the outer end of the opening in the post 17.

Shaft 1 is provided with a longitudinally extending bore 23 adapted to receive a clutch operating rod 24, operable to move inwardly and outwardly to actuate the clutch mechanism. The means for actuating said rod may be of any suitable construction, such as that employed in my said prior applications.

Raised annular portions or collars 25, 26, 25a and 26a are formed on shaft 1, providing recesses 27 and 27a, as shown. Slidably mounted on shaft 1 between portions 26 and 26a, I provide a clutch actuating sleeve 28. This sleeve is secured to rod 24 by a key 29 designed to reciprocate in a slot 30 in shaft 1, the length of said slot being equal to the desired movement of the sleeve 28. The key 29 and its slot 30 are angularly disposed with reference to bifurcated lugs 31 formed on the sleeve 28.

In addition to the sleeve 28 and its connecting parts above described, the clutch actuating mechanism, as illustrated and as preferred, comprises a system of links and connecting members including a plurality of pivotally mounted links having end portions entered between pairs of the lugs 31 and mounted on pins 32. These links 33 are formed with pin-receiving slots 34 and 34a. It will be noted that this construction provides a movable or slidable pivot point for each of the link members 33, so that the links 33 are rocked and at the same time are moved bodily in one direction or the other. The pins 32 are reciprocated in the direction of the axis of the drive shaft for rocking the link members 33 to alternatively apply the shoes of the clutch mechanism.

Referring first to the linkage and mechanism for engaging the clutch drum 7 and driving the pulley in the same direction of rotation as that of the engine shaft, I employ a series of links or cranks 35 pivotally mounted on pins 36 located in recesses or slots 37 in the raised portion 26 of shaft 1. The members 35 are bifurcated to receive the links 33 and carry pins 38 designed to engage the walls of the slots 34. Members 35 are also formed with projecting arms 39.

Disposed in the recess 27, I provide four shoe links 40 for connecting the cranks 35 with friction shoes 41 of the clutch mechanism. Said links 40 are mounted in the recess 27 and are pivotally secured to the portions 25 and 26 by pins 42. Each of the links carries a rotatable compensating sleeve 43 disposed at right angles to the projecting arms 39 of cranks 35, and are provided with openings 44 to receive said arms. Links 40 are cut away, as at 45, to permit free movement of the arms 39 when the link or crank members 35 are moved on their fulcrum pins 36.

Friction shoes 41 are bifurcated to receive the shoe links 40 and are pivotally mounted thereon by pins 46. Shoulders or abutments 47 are provided on the links 40 to support the friction shoes, as at 48. Shaft 1 is cut away at 49 to allow free movement of the links 40.

The actuating mechanism for the reverse side of the clutch mechanism is similar to that just described, and has been designated by similar characters with the addition of the character a.

Members 35 and 35a are provided with spring pins 50 and 50a respectively, for securing tension springs 51 thereto. The clutch drums and their friction shoes are provided with toothed portions $c$ and $d$ respectively, providing a metal-to-metal contact. These toothed portions are arranged concentric with and at right angles to the longitudinal axis of the drive shaft, thus providing a construction distinguished from a clutch in which the toothed portions are parallel with the axis of the shaft.

Referring to Fig. 1, the clutch is shown in the neutral or braking position, with the friction members out of contact. Moving the rod 24 and its sleeve 28 inwardly to the position of Fig. 2 will cause the pulley to rotate in a reverse direction to that of the engine shaft. This movement of sleeve 28 will cause a partial rotation of links 33, due to the shifting of the pivot pins 32, causing pins 38 carried by cranks 35 to move upwardly, thereby lowering arms 39 of the members 35. This downward movement of arms 39 will move shoe-links 40 and friction shoes 41, with their teeth $d$, out of engagement with the teeth $c$ of clutch drum 7. The sleeves 43 will rotate in the links 40, thereby compensating for the movement of the arms 39.

51 designates compensating springs connecting the linkage interposed between the clutch shoes and the main links 33, and function to compensate for the wear of the parts since such springs maintain each part in intimate contact with the adjacent part or parts, particularly the contacting surfaces of the shoes and the drums, and also to urge the movement of the linkage to operate the clutch shoes in an application of and a release of the same relatively to the drums.

It will be understood that, as springs 51 are in tension on the pins 50a of members 35a, the above described movement of link 33 will cause a downward movement of pins 38a; and that a movement of cranks 35a, the arms 39a, and the compensating sleeves 43a, will bring friction shoes 41a into intimate contact with clutch drum 7a, starting bevel gear 11 to rotate. Bevel pinions 20 will reverse the direction of rotation, imparting a reverse rotation to the bevel gear 12 and the pulley.

It will be further noted that, during the movement of the sleeve 28 from the position of Fig. 1 to the position of Fig. 2, the links 33 impart direct upward thrusts to the linkage members 35 through the pins 38 which are positioned in the enlarged slots or openings 34 of the links 33; and that the springs 51 will not only prevent the pins 38 and 38a from leaving the slots, but function to yieldingly urge one set of shoes towards their drum for operative engagement.

When it is desired to rotate the pulley in the direction of rotation of the engine shaft, rod 24 and its sleeve 28 are moved outwardly, thereby causing friction shoes 41 to engage toothed portions c of clutch drum 7.

It will readily be seen that the distance between the pins 50 and 50a remains comparatively constant. This permits a relatively small amount of spring action, dispensing with the usual fatigue of the spring.

I claim:

1. A clutch mechanism comprising, in combination with a drive shaft, two opposing clutch devices mounted on the shaft, of common actuating means for the clutch devices including a shiftable member mounted on the shaft between said devices, a main link member pivoted at one end on the shiftable member, said devices including clutch shoes, and linkage connecting the free end of the main link member and the clutch shoes, said linkage including pivotally mounted shoe-links and a pivoted link member interposed between the main link member and the shoe-links.

2. The combination with a shaft, a pair of clutch shoes, means for alternatively applying said shoes comprising a pivoted link, linkages connecting the link and shoes, a spring operatively connecting the linkages, and means whereby the link may be operated to positively shift either shoe and associated linkage and the position of its pivot may be varied during such operation to shift the position of the spring to vary its action on the shoes.

3. The combination with a shaft, of clutch shoes movable radially to engage and disengage drums, a link extending radially of the shaft, means slidable along the shaft to which said link is pivoted and operable to rock the link longitudinally with respect to the shaft, linkage pivoted to the shaft and one to each shoe, said linkages from their pivots extending outwardly from the axis of the shaft, and said linkages being pivoted to said link outwardly of the pivot point of the link and to the link on opposite sides of a line passing through the pivot point of the link.

4. In combination with a drive shaft, clutch mechanism comprising a pair of clutch shoes, a pair of levers one operatively connected to each shoe for applying the same, a spring connecting the levers, and operating mechanism for the levers for alternatively applying said shoes, said operating mechanism being connected to each lever by a lost motion connection.

5. In combination, a pair of clutch shoes, a pair of levers one operatively connected to each shoe for applying the same, operating mechanism for the levers comprising a bodily movable member connected to each lever by a lost motion connection, and a spring connecting the levers.

6. In combination, a pair of clutch shoes, a pair of levers one operatively connected to each shoe for applying the same, operating mechanism for the levers comprising a floating member connected to each lever by a pin and slot connection, means for rocking and bodily moving said floating member, and a spring connecting the levers.

7. The combination with a drive shaft of a clutch device comprising a pair of movable clutch shoes adapted to engage drums, a pair of levers for actuating said clutch shoes, mechanism for operating the levers to apply the shoes alternatively comprising a member connected to each of the levers by a lost motion connection, and a spring for biasing each lever in a direction to apply its clutch shoe.

8. The combination with a drive shaft of clutch mechanism including a pair of movable clutch shoes adapted to engage drums, a pair of levers for actuating said clutch shoes, mechanism for operating the levers to apply the shoes alternatively comprising a rockable member connected to each lever by a lost motion connection, and a spring for biasing each lever in a direction to apply its clutch shoe.

9. The combination with a drive shaft of clutch mechanism including a pair of movable clutch shoes adapted to engage drums, a pair of levers for actuating said clutch shoes, and mechanism for operating the levers to apply the shoes alternatively comprising a floating member pivotally connected to the levers, and means reciprocable axially of the drive shaft for rocking and bodily moving said floating member.

In testimony whereof I affix my signature.

EDGAR E. GREVE.